Jan. 26, 1937.　　　B. PRATT ET AL　　　2,069,017
MANIFOLD AND VALVE STRUCTURE
Filed Nov. 14, 1934　　　4 Sheets-Sheet 1
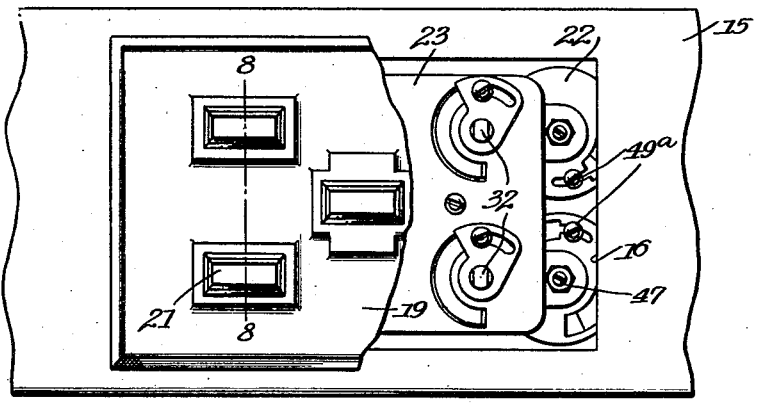
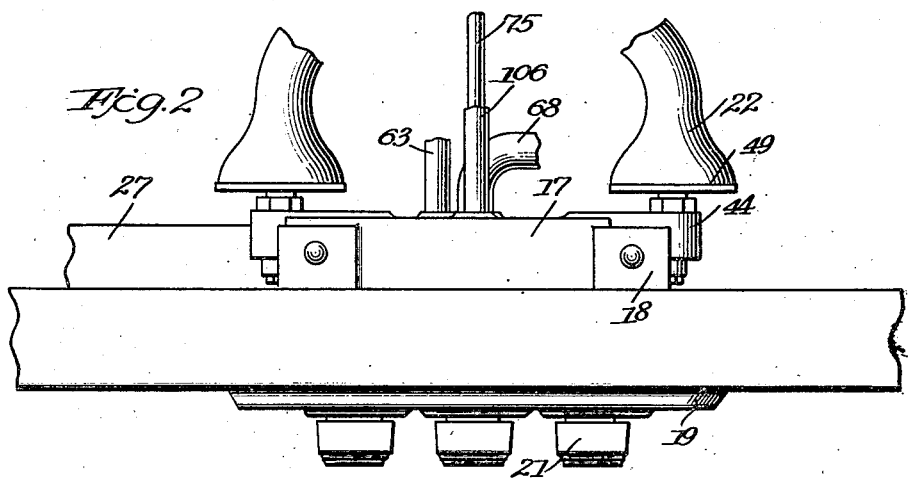
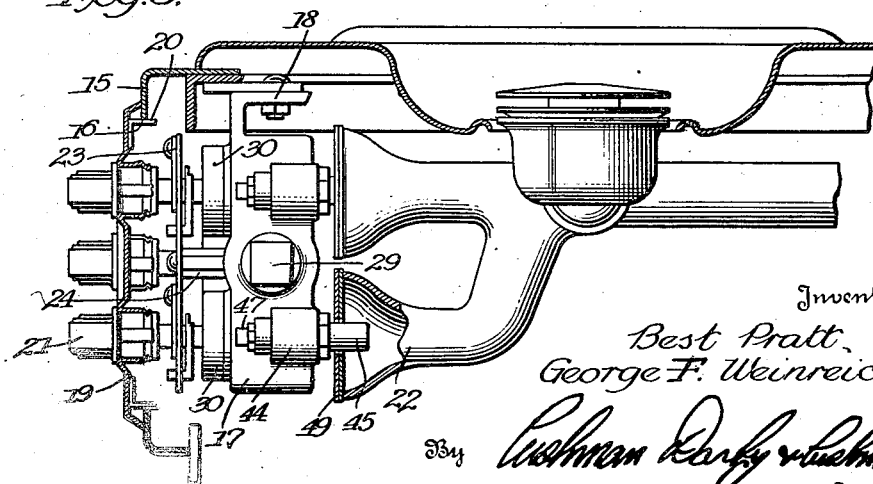
Inventors
Best Pratt
George F. Weinreich
By Cushman Darby & Cushman
Attorneys Jan. 26, 1937.   B. PRATT ET AL   2,069,017
MANIFOLD AND VALVE STRUCTURE
Filed Nov. 14, 1934   4 Sheets-Sheet 2

Inventors
Best Pratt.
George F. Weinreich.
By Cushman Darby & Cushman
Attorneys

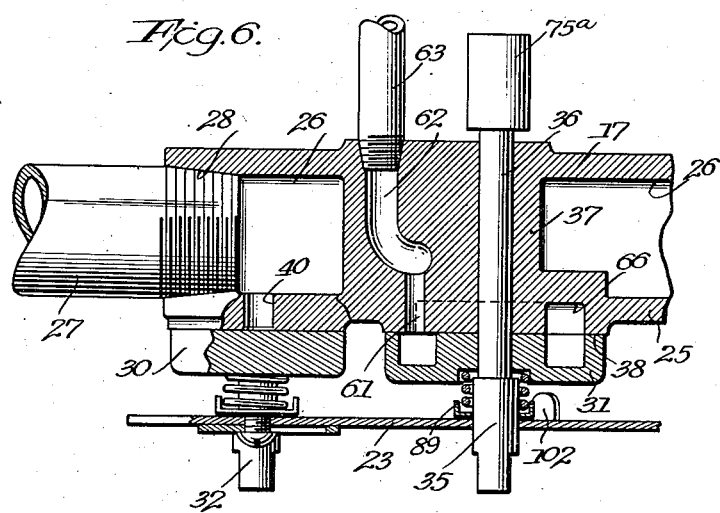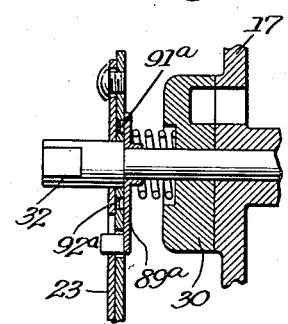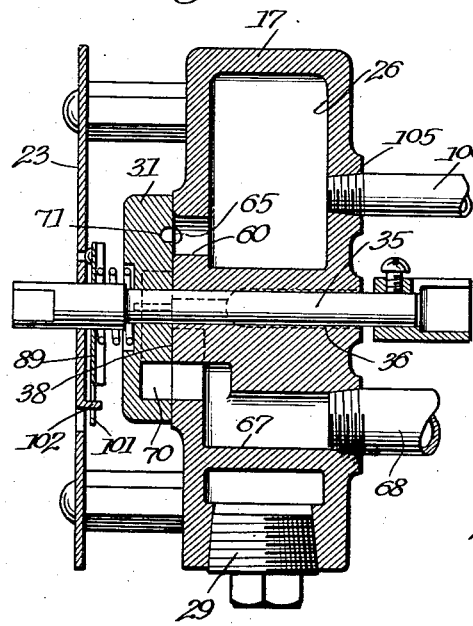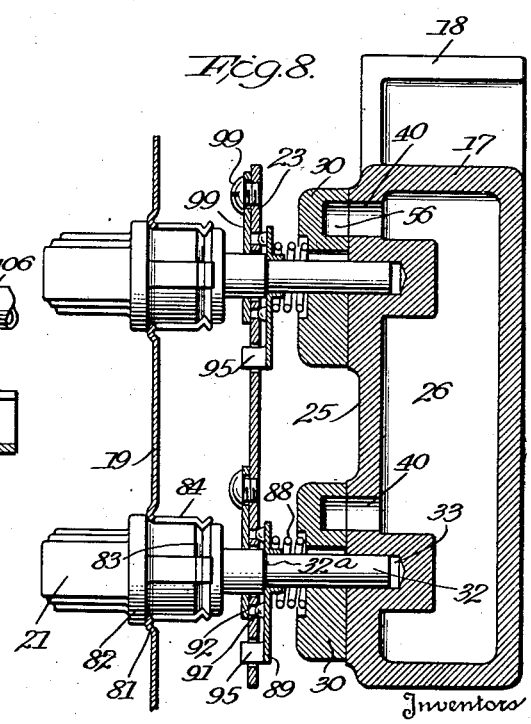

Jan. 26, 1937.   B. PRATT ET AL   2,069,017
MANIFOLD AND VALVE STRUCTURE
Filed Nov. 14, 1934   4 Sheets-Sheet 4

Inventors
Best Pratt
George F. Weinreich
By Cushman Darby Cushman
Attorneys

Patented Jan. 26, 1937

2,069,017

UNITED STATES PATENT OFFICE 2,069,017

MANIFOLD AND VALVE STRUCTURE

Best Pratt and George F. Weinreich, Chicago, Ill., assignors to Brake Equipment & Supply Company, Chicago, Ill., a corporation of Illinois Application November 14, 1934, Serial No. 753,057

9 Claims. (Cl. 277—59)

The present invention relates to a manifold and valve structure particularly designed for use on gas ranges.

An important object of the invention is to provide a manifold and valve structure which is extremely efficient in controlling the flow of gas to the range burners and which will also permit the valves and the Venturi tubes connected thereto to be readily accessible for adjustment.

Older types of ranges have been provided with a manifold in the form of a pipe extending lengthwise of the front of the range, the valve regulating each burner being spaced along this manifold.

The advent of ranges of the closed type has made the use of previous forms of manifolds and valves impracticable and, in the closed type range, it has heretofore been usual to provide a manifold extending from front to rear of the burner box of the range, the valves being positioned along the manifold at various points within the burner box, each valve being controlled by a shaft or operating connection extending from an operating handle at the front of the stove. By the construction of the present invention, the valves are positioned at the front of the stove in a compact group, with a Venturi tube extending from each valve, and the necessity of operating connections extending through the burner box is eliminated.

In the closed type of gas ranges now manufactured, particularly the type in which the individual valves are located within the burner box adjacent the burners controlled thereby, it is difficult to reach the burners and the valves to make adjustments thereto whereby the flow of gas or air may be regulated. By the construction of the present invention, all of the elements thereof, while normally covered, are readily accessible from the front of the range.

Still another object of the invention is to provide an oven valve adapted to be used with a thermostatic valve to control the flow of gas to the oven.

Other objects and advantages of the invention will appear from the following specification and drawings, wherein:

Figure 1 is a front view showing a portion of the front of a gas range, including the control plate, a portion of the plate being broken away to illustrate the valve mechanism;

Figure 2 is a top view of the control plate and the burner connections leading from the rear thereof;

Figure 3 is an end view of the manifold of our invention, the view showing the control plate in transverse vertical section;

Figure 6 is a horizontal sectional view taken on the line 6—6 of Figure 4;

Figure 7 is a vertical sectional view taken on the line 7—7 of Figure 4;

Figure 8 is a vertical sectional view taken on the line 8—8 of Figure 1;

Figure 9 is a detail sectional view showing a valve in full open position;

Figure 4:
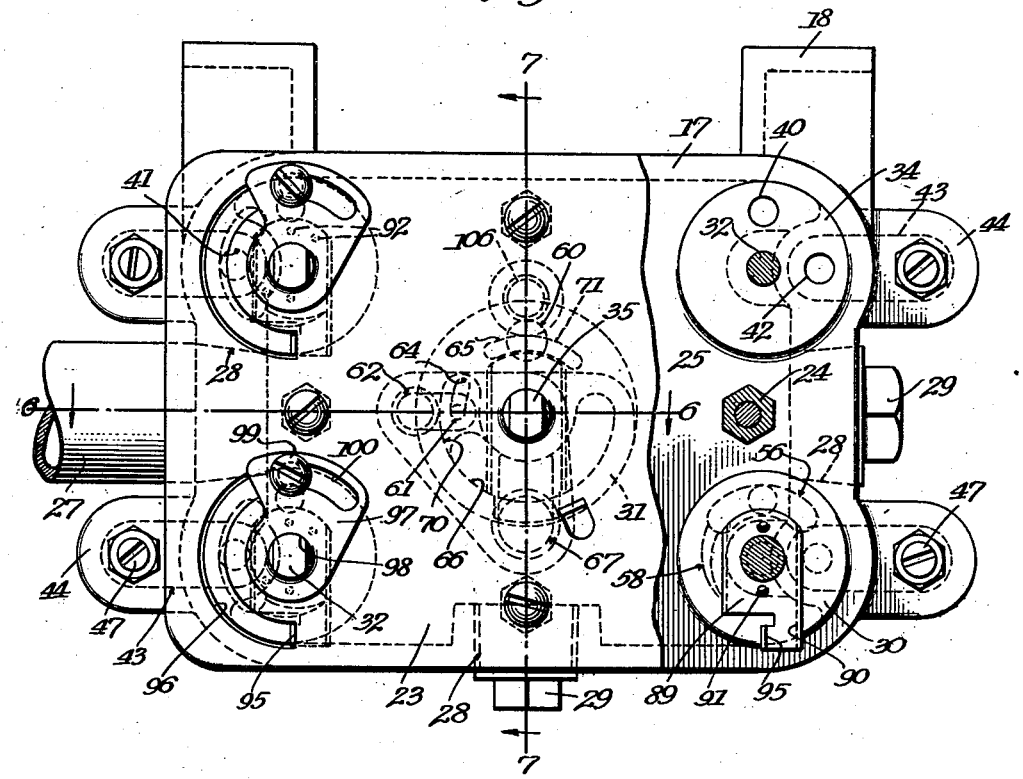
Figure 4 is a front view of the manifold of the present invention, a portion of a plate used with the manifold being broken away.

Referring to Figures 1 to 3, the numeral 15 designates the front wall of a gas range, which wall is provided with an aperture 16. A manifold 17 is positioned within the aperture 16 as shown in Figure 3, the manifold being secured to the range frame by bolts passing through brackets 18 carried by the manifold. The aperture 16 is adapted to be closed by a control or cover plate 19 held in place by flat springs 20 engaging the inner edges of the aperture, permitting the cover plate to be readily removed. Valve handles or knobs 21, each operatively connected to the stem of a valve included in the manifold structure and adapted to control one of the range burners, extend through the cover plate 19. Venturi tubes 22 extend rearwardly from the manifold 17 to the top burners of the range, the ends of the Venturi tubes adjacent the manifold being spaced from the latter and so positioned with respect thereto as to be in alignment with the gas supply nozzles extending from the manifold.

As is best shown in Figures 3 and 8, a plate 23 is positioned between the manifold 17 and the front or cover plate 19, plate 23 being secured to the manifold by means of machine screws threaded in projections 24 extending from the front wall 25 of the manifold.

The manifold 17 is substantially box-like in shape and includes a central chamber 26 to which gas flows through a supply pipe 27 (Figure 4). Ports 28 are provided in the end walls and bottom wall of the manifold and the supply pipe may be connected to either of these, the other ports 28 then being closed by plugs such as 29.

Figure 5:
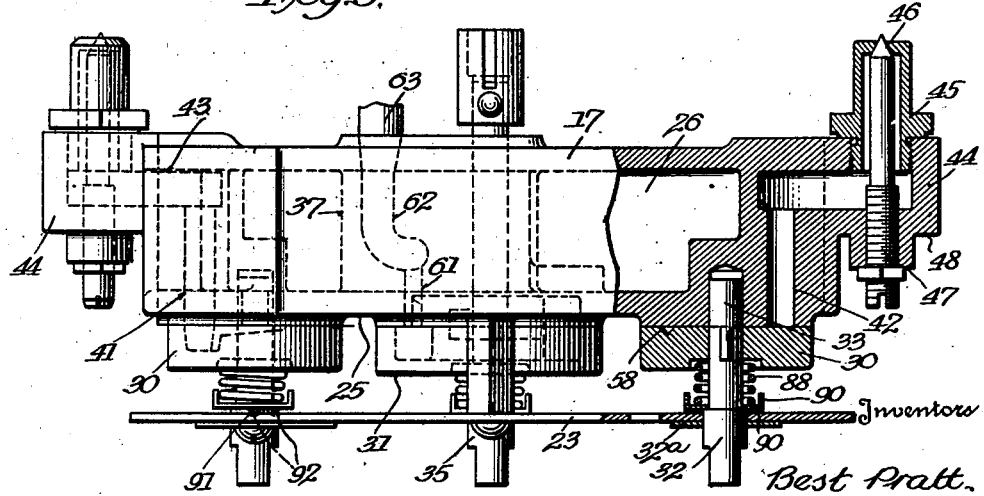
Figure 5 is a top plan view of the structure shown in Figure 4, a portion of the view being in longitudinal horizontal section.

In the present embodiment of the invention, the manifold 17 is provided with five disc valves, four of these valves controlling the top burners of the stove and being designated by the numeral 30, the fifth valve, designated by the numeral 31, being provided for the purpose of controlling the flow of gas to the oven burner. As is best shown in Figures 4 and 5, the valve discs are positioned upon the front face 25 of the manifold 17, one of the four valves 30 being positioned adjacent each corner of the manifold and the oven control valve 31 being positioned centrally of the front face of the manifold. The valve discs 30 are keyed to rotatable valve stems or shafts 32 which turn in sockets 33 drilled in the front face of the manifold 17 centrally of valve seats 34. As shown in Figure 7, the oven control valve 31 is keyed to a stem or shaft 35 which rotates in a bore 36 extending through a solid portion 37 which bridges the front and rear walls of the manifold. The valve 31 moves upon a seat 38. The means for holding the valve stems or shafts in their respective sockets and bores and for holding the valves closely in contact with their valve seats will be hereinafter described.

Referring to the top burner valve seat 34 illustrated in the upper right hand corner of Figure 4, it will be noted that a port or passage 40 opens to the upper portion of the seat, this port, as best shown in Figure 8, extending to the central chamber 26 of the manifold. Gas may therefore flow outwardly through this port and to the valve disc. An outlet port or passage 42, preferably to the right of and below supply port 40, extends from the seat 34 to a chamber 43 formed in the side wall and in a lateral extension 44 of the manifold 17. The extension 44 has a nipple 45 threaded in its inner face (Figure 5), which nipple is provided with a tapered port 46. A needle valve 47 is threaded in the outer face 48 of the extension, the tapered end of the needle valve being adapted to adjustably control the port 46 and thereby control the flow of gas moving from that port. The nipple 45 is intended to project into the inlet of a venturi 22, as shown in Figure 3, and the air adjustment plate 49 provided upon the Venturi tube fits upon the nipple to center and support the Venturi tube with respect thereto.

The valve seat at the lower right hand corner (Figure 4) of the manifold is provided with ports and passages identical with that described above and an extension 44 and needle valve 47 are also provided for this valve seat. The two valve seats 34 adjacent the left hand edge of the manifold differ from those just described only in that their outlet ports 41 are at the left of the valve seat so that they may be conveniently connected by a passage 43 to the adjacent extension 44.

Figure 11:
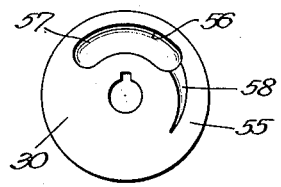
Figure 11 is a detail view showing the inner face of the valve disc used with the manifold to control the oven burner, and Figures 12 to 15 diagrammatically illustrate various positions of the oven control valve disc with respect to the supply and outlet ports which it controls.

As best shown in Figure 11, each of the four disc valves 30 is provided on its inner face 55 with an arcuate groove or passage 56, the groove 56 including a portion 57 of uniform cross section and having rounded ends and also a tapered portion 58 extending from one end of the portion 57, the tapered portion 58 having its larger end opening to the portion 57 of the groove.

The operation of the valves controlling the top burners is as follows:

When the valve discs 30 at the right hand edge of the manifold are in closed position, as illustrated by the valve in the lower right hand corner of Figure 4, the larger portion 57 of the groove 56 will be opposite or in alignment with the gas supply port 40 and the gas outlet port 42 will be closed by the seat or inner face of the valve disc. When gas is to flow to the burner, the valve disc will be turned in a clockwise direction to move the portion 57 of the groove 56 into alignment with the gas outlet passage 42, permitting full flow of gas from supply passage 40, through groove 56, passage 42 and thence to the burner. Continued turning movement of the valve disc will move the tapered portion 58 of the groove 56 opposite the outlet port 42, reducing the flow of gas to this port, the degree of reduction being regulated by the relative position of the tapered portion 58 with respect to the supply passage 40. The arrangement described above, whereby a full flow of gas is initially supplied each burner, is highly desirable in ranges provided with a pilot light, since the full flow of gas insures that the burner will be immediately lighted by the pilot light. Obviously, once the burner has been lighted, the flow of gas can be regulated by further rotation of the valve to obtain the desired flame at the burner.

As is also shown in Figure 4, the two valve discs 30 at the left-hand edge of Figure 4 have the larger portions 57 of their grooves 56 opposite the outlet passages 41 when the valve discs are in closed position, the supply passages 40 of these two valves then being closed by the face of each valve disc. Rotation of either valve disc in a clockwise direction will first cause the passages 41 and 40 to be bridged by the larger portion 57 of the valve disc to permit full flow and further turning movement will bring the tapered groove 58 opposite outlet port or passage 41 regulating the flow of gas to the desired degree.

Referring to the oven control valve located centrally of the manifold, the seat 38 of this valve is best shown in Figures 12 to 15, and, as there shown, has a supply port or passage 60 opening thereto from the central chamber 26 of the manifold 17 as also shown in Figures 4 and 7. A relatively small pilot burner passage 61 opens from the valve seat to a passage 62 extending through the solid portion 37 of the manifold to the rear face of the manifold, a pipe 63 extending from the latter passage to the pilot burner of the oven. A groove 64 extends from the outlet port 61 toward the supply port 60 and a groove 65 extends from the supply port toward the pilot burner outlet groove 64, both grooves being arcuate, short, and of relatively small cross section. The face of the valve seat 38 is also provided with an arcuate groove 66 of larger cross section and extending over approximately 180° of the seat face. The groove 66 opens to a port or passage 67 extending through the solid portion 37 of the manifold to the rear face of the latter. A pipe 68 is fitted in the outer end of the port 67 and extends to the main burner of the oven or, if a thermostatic control valve is used in connection with the present manual oven control valve, the pipe 68 extends to the thermostatic valve.

Figure 10:
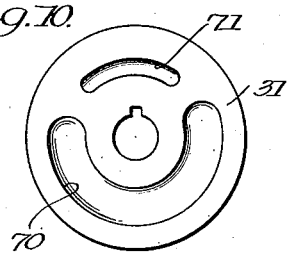
Figure 10 is a detail view showing the inner face of the valve disc used with the manifold to control the top burners of a range.
Figure 12:
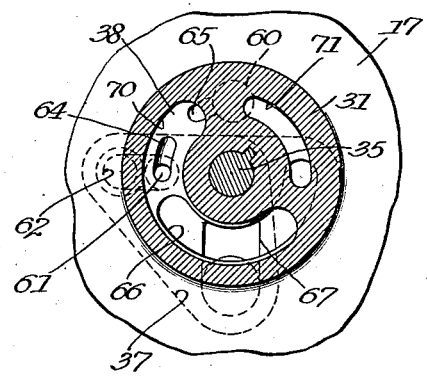

As shown in Figure 10, the valve disc 31 which cooperates with the seat 38 to control the flow of gas to the oven is provided with an arcuate groove 70 of substantially the same cross section as the large groove 66 in the face 38, but somewhat longer than the latter groove, as indicated in Figure 12. Also, the disc 31 has in its inner face an arcuate groove 71 of substantially the same cross section as the grooves 64 and 65 in the valve seat 38, but of greater length than either of these two grooves. As shown in Figure 10, the groove 71 is positioned substantially midway between the ends of the larger groove 70. All of the grooves in the seat face 38 and in the disc 31 are provided with rounded ends.

The operation of the oven control valve is diagrammatically shown in Figures 12 to 15, wherein the larger valve seat groove 66 is indicated as of slightly less width than the disc groove 70, this being done to make clearer the relative positions of the grooves. When the disc 31 is rotated in a clockwise direction from the closed position shown in Figure 4 to a position substantially approximating that shown in Figure 12, the shorter groove 71 will first connect the supply port 60 and the outlet groove 66, the movement of the disc simultaneously causing the larger disc groove 70 to open to the seat groove 65 communicating with the supply port 60. In this position, gas will flow to both the oven burner, through the port 67 and pipe 68, and also to the oven pilot burner, through the port 61, passage 62 and pipe 63. The flow of gas will, of course, be reduced if the respective grooves of the valve disc and seat face do not communicate as fully as is illustrated in Figure 12.

Figure 13:
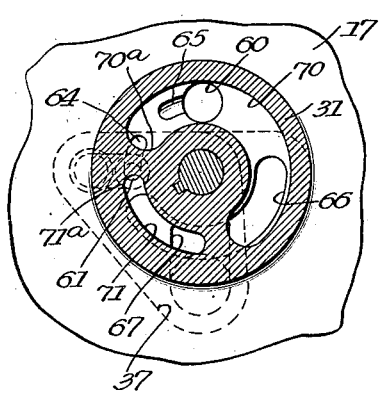

Further rotation of the disc 31 in a clockwise direction to the position indicated in Figure 13, wherein the disc has turned approximately 225° from closed position, will cause the blank portion of the face of the disc between the trailing end 70a of disc groove 70 and the forward end 71a of smaller disc groove 71 to move across the seat face groove 61 which communicates with the pilot burner pipe. However, since this blank portion of the valve disc is of less length than the length of the pilot burner groove 61, gas will continue to flow to the pilot burner, both to the left (Figure 13) through the larger disc groove 70 and also to the right through larger disc groove 70, seat face groove 66 and smaller disc groove 71. It will be appreciated that in any position of the valve disc intermediate the positions shown in Figures 12 and 13, gas will flow to both outlets 61 and 67 due to the fact that the larger valve disc groove 70 will, in such intermediate positions, always be open to both the pilot burner seat groove 64 and main oven burner seat groove 66.

Figure 14:
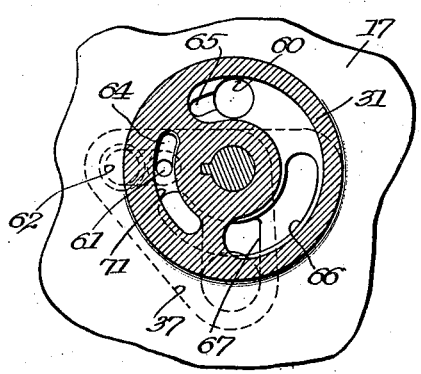
Figure 15:
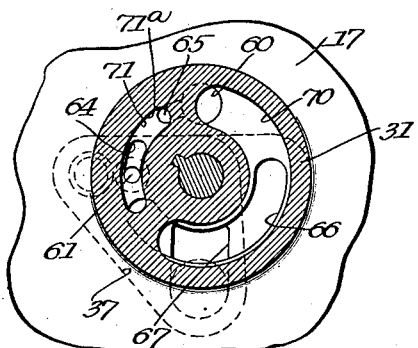

Slightly further movement of the disc 31 will position the grooves thereof as shown in Figure 14 so that gas will flow from the supply port 60 to the main burner outlet port 67 through the larger disc groove 70 and will also flow to the pilot burner outlet port 61 from the larger seat face groove 66 and through disc groove 71. The flow of gas to both outlets will continue in this manner until the disc is turned to bring advance end 71a of the smaller disc groove 71 opposite the left hand end of supply groove 65, which relation will exist when the disc reaches a position immediately in advance of the position shown in Figure 15. In the position shown in Figure 15, gas will flow to the pilot outlet 61 from supply groove 65 entirely through the smaller disc groove 71 and will flow to the main burner outlet 67 in the opposite direction through the larger disc groove 70. The valve disc may of course be rotated to a position beyond that shown in Figure 15 to finally move the larger disc groove 70 out of communication with supply port 60 so that no gas will flow to the main oven burner, the valve disc 31 being rotatable through substantially 360°. A person operating the valve is thereby enabled to shut down the over burner independently of thermostatic action and use a small flame at the main burner or to entirely shut off flow to the main burner while the pilot burner is still lighted.

If the manual control valve described above is to be used with a thermostatic valve, its shaft 35 may be connected to a rod 75 coupled to the thermostatic control valve, not shown, by a coupling, such as that indicated by the numeral 75a.

If the manual valve 31 is used with a thermostatic valve, the manual valve will not finally control the volume of flow of gas to the oven burner but will merely supply gas to the thermostatic valve through the pipe 68. The shaft 35 of the manual valve, being connected to the operating shaft or means of the thermostatic valve by the connector 75, will insure that the opening of the thermostatic valve will be regulated to the desired degree in accordance with the degree of rotation given the shaft 35 of the manual valve. As is usual, the shaft 35 may carry a dial, not shown, bearing temperature indications, and rotation of the shaft 35 and dial to the desired degree will actuate the thermostatic valve to the proper stage to permit a volume of flow to the oven burner which will insure a flame at the oven to maintain the temperature for which the dial and shaft are set.

Should our manual valve not be used with a thermostatic control valve, the passage 62 leading from the pilot burner port 61 may be sealed. When the manual valve is used in connection with a thermostatic valve, the pipe 63 in passage 62 will lead directly to the pilot burner so that this burner will be controlled entirely by the manual valve and will not be affected by the thermostatic valve. By this arrangement, the complete closing off of gas flow through the pipe 68 by the thermostatic valve will not affect the flow to the pilot valve and a flame will be continually burning at the pilot burner during the entire time that the manual valve is in open position. Hence, if the thermostatic valve should temporarily extinguish the flame at the main oven burner or if it should cut down the flow of gas to such an extent that combustion would not be supported at this burner, the main burner will again be ignited by the pilot burner when the thermostatic valve reopens.

As has been stated above, the oven control valve 31 may be turned through approximately 360° and this will give a wide range of adjustment for the opening of the thermostatic valve, if the manual valve is used with such a valve. If no thermostatic valve is connected to our manual valve, the degree of rotation of the manual valve may be substantially reduced. In the latter case, the flow of gas to the oven burner would be finally controlled by the manual valve and could be adjusted through the usual degree because of the fact that the various ports and grooves provided in the valve seat and valve disc, respectively, have rounded ends and the degree of alignment of the rounded end of a groove or passage in the valve disc with a passage in the valve seat will finely adjust the volume of gas flow.

The valve stems or shafts 32 and 35 are flattened at their ends, as shown in Figures 7 and 8, and are adapted to be turned by the handles or knobs 21, each knob being provided with a socket of a shape to fit the outer end of the valve stem which it engages. The knobs 21 are fitted in openings 81 provided in the front or control plate 19, the openings 81 being in axial alignment with the respective valve stems or shafts. Each knob is provided with a shoulder 82 intermediate its length and an annular groove 83 adjacent its inner end. The shoulder 82 is adapted to be closely adjacent the other surface of the control plate and the groove 83 of each knob is engaged by spring fingers 84 extending from the rear face of the plate 19 and spaced about the opening 81. By the above arrangement, the control plate and the knobs carried thereby may be removed from and replaced upon the stove, particularly if the position of the valve stems and the knobs is unchanged during removal.

The means to limit the rotation of the valve discs 30 which control the top burners to hold these discs in contact with their respective seats is best shown in Figure 8. Each valve stem or shaft 32 is encircled by a coil spring 88, the inner end of the coil spring bearing in a socket in the outer surface of the valve disc 30 and the outer end bearing upon a stop plate 89 having a forced fit upon the stem 32 and bearing upon a shoulder 32a formed by an enlargement of the stem. The stop plate 89 is, as shown at the lower right-hand corner of Figure 4, substantially rectangular in shape and may be provided at opposite edges thereof with stiffening flanges 90.

Protuberances or lugs 91 are provided upon the front face of each stop plate 89, which protuberances may be seated in apertures or sockets 92 in the plate 23 when the valve is in full open or in closed position. Obviously, the apertures or sockets 92 may be arranged to have the protuberances engage the same in any other position of the valve. The relative arrangement of the protuberances 91 and apertures 92 is best shown by the two valves at the left of Figure 4. Figure 8 shows the valves in closed position and with the protuberances and apertures in alignment. When the valves are turned in a clockwise direction to the relatively slight extent necessary to permit full flow to the burners, the protuberances 91 may seat in another set of apertures 92. If the flow of gas is to be reduced, the valves may be turned further in a clockwise direction so that the flow will be through the tapered portion 58 of groove 56 as heretofore described.

In order to limit the opening movement of the top burner valves 30, a tang 95 is provided upon an extension of each stop plate 89, which tang extends forwardly and into an arcuate slot 96 in the plate 23 as illustrated in the lower left hand corner of Figure 4 and in Figure 8.

When the valve is in closed position, the tang 95 will ordinarily be in contact with the lower end of the slot 96 and when the valve has been turned to a position where the tapered portion 58 of its groove 56 bears such a relation to the ports 40 and 41 as to permit the lowest practicable stage of flame at the gas burner, the tang 95 will contact with the adjacent edge of a stop plate 97 fixed to the plate 23. The stop plate 97 is substantially segmental in shape and provided with an opening 98 so that it may be seated upon the valve stem 32. In order to permit the position of the stop plate 97 to be adjusted relative to the slot 96, a screw 99 threaded in the plate 23 is provided, this screw extending through an arcuate slot 100 adjacent the outer edge of the stop plate 97. Obviously, the position of the stop plate 97 may be adjusted by loosening the screw 99 and moving the stop plate in the desired direction.

In order to limit the opening movement of the oven control valve 31, an extension 101 (Figure 7) is provided upon a stop plate 89 having a forced fit upon the stem 35. The extension 101 is adapted to contact with a shoulder or ear 102 struck inwardly from the plate 22 when the valve is in closed position. Since the oven control valve has a fixed range of turning movement, it is not necessary to provide an adjustable stop element for this valve.

Figure 9 shows a modified form of lock element. In this view, the plate 89a carries one or more pins 91a which project into apertures 92a in the plate 23 when the valve is in closed position. By this arrangement, the valve cannot be accidentally opened since its shaft 35 must be forced axially inwardly to release the pins 91a from the apertures 92a before the valve can be turned.

If desired, the plate 89a may also be provided with protuberances to indicate positions of the valve other than the closed position. Also, the protuberances may lock the valve in "on" position if desired.

The shoulder 82 of each valve knob 21 has sufficient inward movement with respect to plate 19 to permit the corresponding valve stem to be moved inwardly and thereby release the projections 91 or pins 91a from the apertures 92.

As shown in Figures 7 and 8, a port 105 is provided in the rear wall of the manifold 17, this port communicating with the central chamber 26 of the manifold. A pipe 106 is fitted in the port 105, which pipe extends to the pilot burner provided in the burner box, not shown.

Since the cover or control plate 19 is held in position in the aperture 16 of the front wall 15 of the stove by flat springs 20, this plate may be readily removed from the stove, removal of the plate also withdrawing the knobs or handles 21 from the ends of the valve stems or shafts 32 and 35.

When the front plate 19 is removed, the position of the segmental plates 97 which determine the range of opening movement of the top burner valves 30 may be adjusted by loosening the screws 99. Also, since the Venturi tubes leading to the top burners are centered upon the sleeves 45 extending from the extension or offset portions 44 of the manifold, the needle valves 47 controlling the flow of gas to the Venturi tubes will also be accessible for adjustment merely by removal of the cover plate 19. Furthermore, the air supply to the Venturi tubes can be adjusted with the cover plate 19 removed since the screws 49a which secure the usual movable plates upon the air inlets of the Venturi tubes 22 will be accessible through the aperture 16.

It will be understood that the invention is not limited to the details of construction shown in the drawings and described in the specification and that the examples of the use of the various forms of the device which have been given do not include all of the uses of which the device is capable; also, that the phraseology employed in the specification is for the purpose of description and not of limitation.

We claim:—

1. A valve structure comprising a valve body element, a plate-like stationary element spaced from said valve body element, a rotatable valve element between said elements and seated with respect to said valve body element, a shaft carrying said valve element and rotatable with respect to said valve body element and stationary element, said valve and valve body elements having flow passages therein adapted to be aligned by rotation of said valve element, means on said shaft to cooperate with said stationary element to hold said shaft and valve element in predetermined position, and resilient means between said stationary element and valve element to tend to hold said last named means and said stationary element interengaged and to hold said valve element seated with respect to said valve body element.

2. A valve structure comprising a valve body element, a plate carried by and spaced from said valve body element, a disc valve element rotatable with respect to said valve body element and positioned between said first named elements, a shaft carrying said valve element journalled in said valve body element and said plate, said plate having an arcuate slot therein, a member carried by said shaft including a tang movable in said slot to limit the movement of said valve element, and resilient means on said shaft between said valve element and said tanged member to hold said valve element seated and said member engaged with said plate.

3. A valve structure comprising a valve body element, a plate carried by and spaced from said valve body element, a disc valve element rotatable with respect to said valve body element and positioned between said first named elements, a shaft carrying said valve element journalled in said valve body element and said plate, said plate having an arcuate slot therein, a member carried by said shaft including a tang movable in said slot to limit the movement of said valve element, means on said member engaging said plate to tend to hold said valve in a predetermined position and resilient means on said shaft between said valve element and said last named means to hold said valve element seated and to hold said last named means in contact with said plate.

4. A valve structure comprising a valve body member provided with a plurality of planar valve seats, a fluid supply chamber within said body member communicating with each of the valve seats, a plurality of disc valve elements respectively rotatable upon said valve seats, delivery passages within said valve body respectively communicating with each of the valve seats, said valve elements being provided with passages adapted to be aligned for flow of fluid therethrough upon rotation thereof, said valve body element including extensions respectively associated with each valve seat and through which a supply passage extends, said extensions being adapted to support the inlet end of Venturi tubes.

5. A valve structure comprising a valve body element, a plate-like element secured to and spaced from said valve body element, a valve element positioned between said first named elements and seated with respect to said valve body element, a shaft carrying said valve element and rotatable with respect to said valve body and said plate-like elements, said plate-like element being provided with an arcuate slot, a member carried by said shaft and extending into said slot, a member carried by said plate-like element and rotatable with respect to the latter to overlie the slot and adjust its length.

6. A valve structure comprising a valve body element, a plate-like element secured to and spaced from said valve body element, a valve element positioned between said first named elements and seated with respect to said valve body element, a shaft carrying said valve element and rotatable with respect to said valve body and plate-like elements, said plate-like element being provided with an arcuate slot, a member carried by said shaft and extending into said slot, a member carried by said plate-like element and rotatable with respect to the latter to overlie the slot and adjust its length, cooperating means on said member and said plate-like element to hold said shaft in a predetermined position, and resilient means between said member and said valve element to hold the valve element seated and to hold the cooperating means in contact.

7. A valve structure comprising a valve body element, a plate-like element secured to and spaced from said valve body element, a valve element positioned between said first named elements and seated with respect to said valve body element, a shaft carrying said valve element and extending through said plate-like element, said plate-like element having an arcuate slot therein, means moving with said valve element and engaging the slot to limit the movement thereof, and a plate associated with said plate-like element and centered on said valve shaft to move about the latter and opposite the slot to adjust the length of the latter.

8. A valve structure comprising a valve body element, a plate-like element secured to and spaced from said valve body element, a valve element between said first named elements and seated with respect to said valve body element, a shaft carrying said valve element and rotatable and axially movable with respect to said valve body element and said plate-like element, said plate-like element having a depression therein, a member movable with said shaft provided with means to engage said depression to thereby lock the shaft against rotation, a spring between said valve element and said member to hold said valve element seated and said member in contact with said plate-like element and permitting axial movement of said shaft and said member to release said locking means.

9. A valve structure comprising a valve body, a plate-like element secured to and spaced from said valve body, a valve element positioned between said first named elements and seated with respect to said valve body, a shaft carrying said valve element and rotatable and axially movable with respect to said valve body and plate-like element, said plate-like element having depressions in its inner face, a plate member fixed to said shaft and provided with means adapted to seat in the depressions, resilient means between said plate member and said valve element to hold the latter seated and to maintain said plate member in contact with said plate-like element, said plate-like element having an arcuate aperture therein, and means carried by said plate-like element overlying the aperture and movable to limit the rotational movement of said shaft and valve element.

BEST PRATT.
GEORGE F. WEINREICH.